US012380532B2

(12) United States Patent
Kokura

(10) Patent No.: US 12,380,532 B2
(45) Date of Patent: Aug. 5, 2025

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Toru Kokura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 622 days.

(21) Appl. No.: 17/669,399

(22) Filed: Feb. 11, 2022

(65) Prior Publication Data

US 2022/0277417 A1 Sep. 1, 2022

(30) Foreign Application Priority Data

Mar. 1, 2021 (JP) ................. 2021-032033

(51) Int. Cl.
*G06T 3/4015* (2024.01)
*G06N 3/08* (2023.01)
*G06T 3/4046* (2024.01)
*G06T 5/50* (2006.01)

(52) U.S. Cl.
CPC ............ *G06T 3/4015* (2013.01); *G06N 3/08* (2013.01); *G06T 3/4046* (2013.01); *G06T 5/50* (2013.01); *G06T 2207/20224* (2013.01)

(58) Field of Classification Search
None
See application file for complete search history.

(56) References Cited

U.S. PATENT DOCUMENTS

| 6,332,038 B1* | 12/2001 | Funayama | H04N 5/272 |
| | | | 375/E7.081 |
| 10,909,349 B1* | 2/2021 | Tripathi | G06T 19/00 |
| 11,200,643 B2 | 12/2021 | Kokura | |
| 2016/0035069 A1* | 2/2016 | Min | G06T 5/20 |
| | | | 382/266 |
| 2020/0258196 A1 | 8/2020 | Kokura | |
| 2021/0358081 A1 | 11/2021 | Kokura | |
| 2021/0398247 A1 | 12/2021 | Kokura | |
| 2022/0198784 A1* | 6/2022 | Toporek | G06V 10/7747 |

(Continued)

FOREIGN PATENT DOCUMENTS

CN 111383200 A 7/2020

OTHER PUBLICATIONS

Bonanomi, Cristian, et al. "I3D: a new dataset for testing denoising and demosaicing algorithms." Multimedia Tools and Applications 79 (2020): 8599-8626. (Year: 2020).*

(Continued)

*Primary Examiner* — Sean M Conner
(74) *Attorney, Agent, or Firm* — Carter, DeLuca & Farrell LLP

(57) ABSTRACT

An image processing apparatus comprises an acquisition unit configured to acquire a probability distribution of a color in a teacher image group, a generation unit configured to generate, as an artificial teacher image, an image having a color sampled based on the probability distribution, and a learning unit configured to perform learning of a learning model for performing a demosaicking inference, by using the artificial teacher image.

19 Claims, 11 Drawing Sheets

(56) References Cited

U.S. PATENT DOCUMENTS

2023/0072040 A1* 3/2023 Kakishita ................. G06N 3/09

OTHER PUBLICATIONS

Salimans, Tim, et al. "Pixelcnn++: Improving the pixelcnn with discretized logistic mixture likelihood and other modifications." arXiv preprint arXiv: 1701.05517 (2017). (Year: 2017).*
He, Kaiming, et al. "Deep Residual Learning for Image Recognition." arXiv preprint arXiv:1512.03385 (2015). (Year: 2015).*
Michael Gharbi et.al, "Deep Joint Demosaicking and Denoising" Siggraph Asia 2016 (Nov. 2016) pp. 1-12, vol. 35, No. 6.
Notice of Reasons for Refusal issued by the Japanese Patent Office on Jan. 24, 2025 in corresponding JP Patent Application No. 2021-032033, with English translation.

* cited by examiner

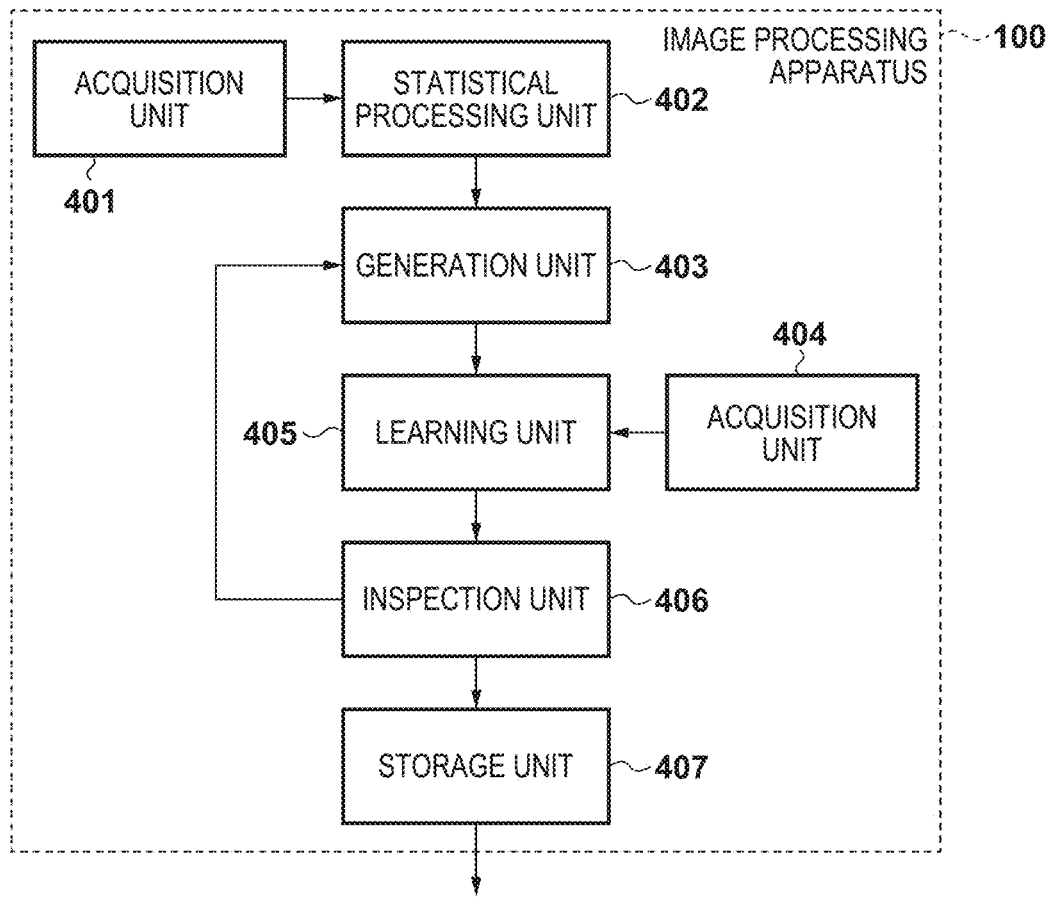
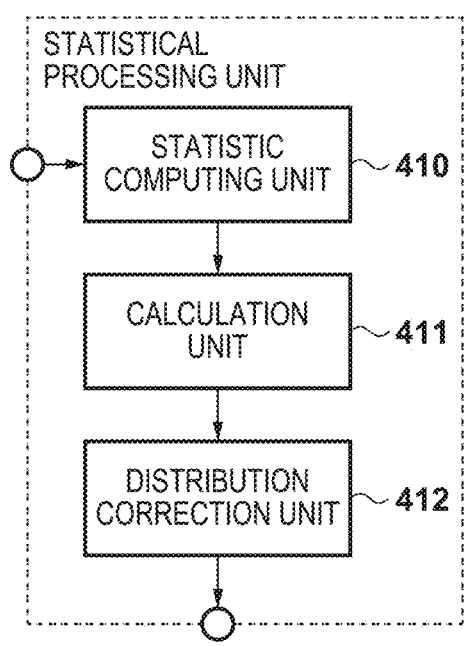
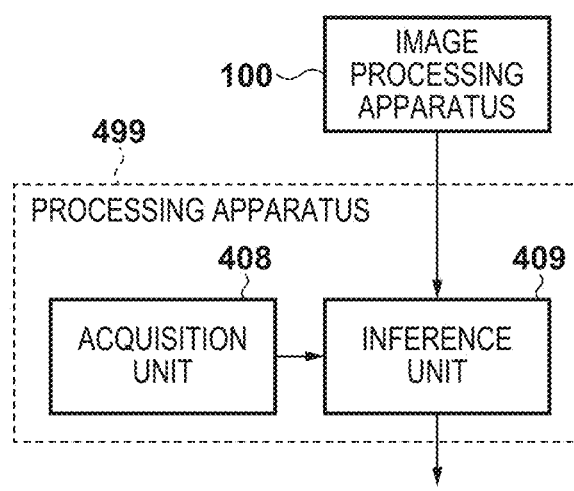

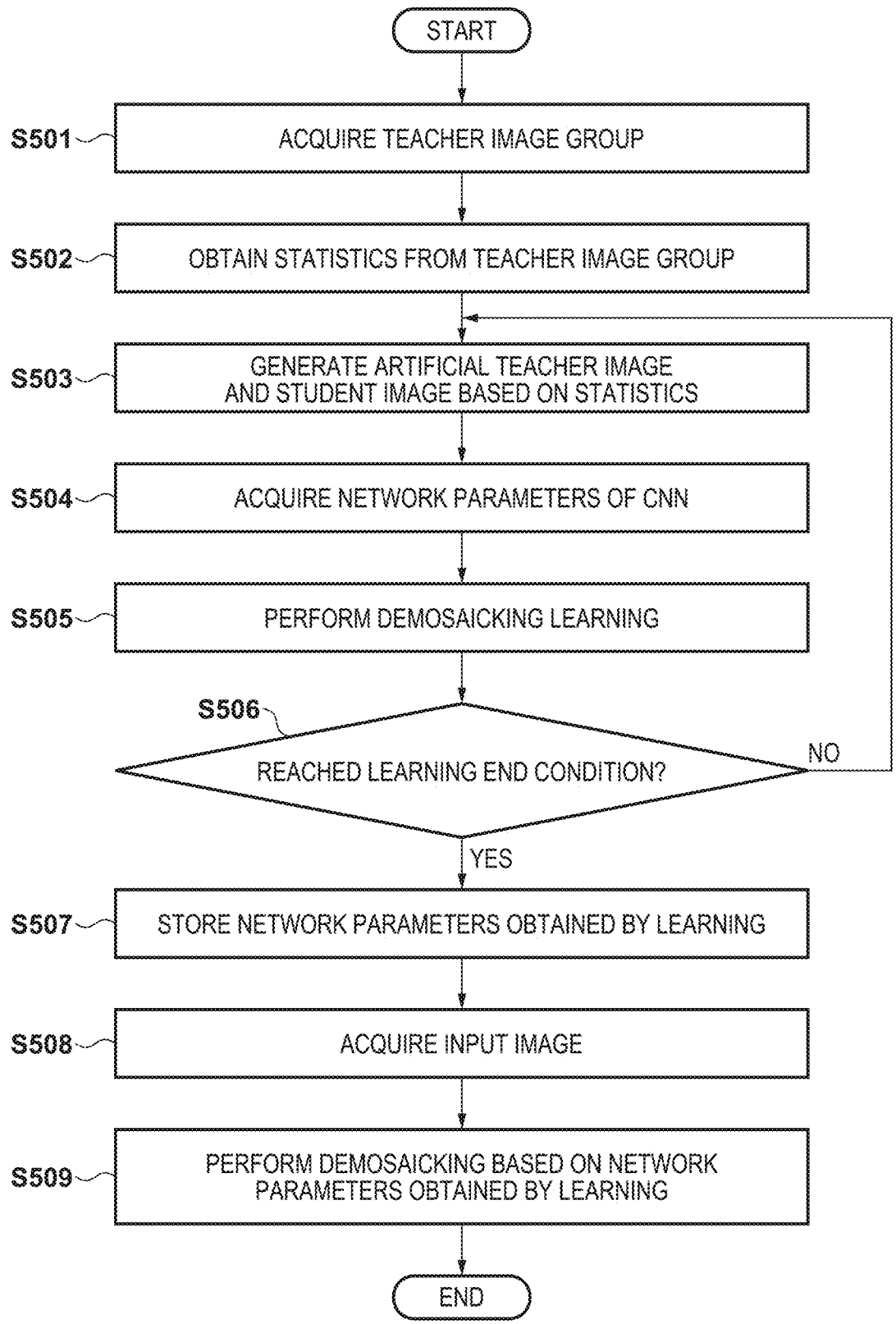

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to learning techniques.

Description of the Related Art

In an image capturing element used in a digital image capturing apparatus such as a digital camera, for example, a color filter consisting of an RGB array is mounted, and the configuration is such that light of specific wavelengths enters each pixel. Specifically, a color filter having a Bayer array, for example, is often used. An image captured by a Bayer array is a so-called mosaic image in which only a pixel value corresponding to one of the RGB colors is set for each pixel. A development processing unit of a digital image capturing apparatus performs various signal processing such as demosaicking processing for interpolating the pixel values of the remaining two colors with respect to the mosaic image, and thereby generates and outputs a color image. There is a conventional demosaicking processing technique in which each RGB color corresponding to each pixel is calculated and set by performing linear interpolation of pixel values for the same color in the periphery by applying a linear filter to sparse pixel values of each RGB color. Since this technique has low interpolation accuracy, many nonlinear interpolation techniques have been proposed so far. However, in these methods, there is a problem that false colors and artifacts occur in image regions that they are respectively not good at handling.

Therefore, in recent years, a data-driven interpolation method that applies deep learning technology has been proposed. Deep Joint Demosaicking and Denoising, Siggraph Asia, 2016 discloses a technique for training CNN (Convolutional Neural Network) based demosaicking networks. In this technique, learning is performed using a group of teacher images collected from the natural world. Thereafter, the learning results are used to make an inference (a task for regression on input data) by inputting a mosaic image into the CNN to convert it into an RGB image.

However, in conventional techniques, although a sufficient amount of data can be ensured, there is a problem that deviations occur in the distribution of hues in the teacher image group. When deep learning is performed using such a group of teacher images, it may not be possible to generate a highly robust learning model. For example, in the case of the learning of a CNN based demosaicking network disclosed in Deep Joint Demosaicking and Denoising, Siggraph Asia, 2016, when there is deviation in the distribution of hues in the teacher image group used for learning, when a mosaic image is demosaicked using a learned model, artifacts such as a false pattern or the like that are not actually present occur. This phenomenon is conspicuous in hues having a low frequency in the teacher image group.

SUMMARY OF THE INVENTION

According to the first aspect of the present invention, there is provided an image processing apparatus, comprising: an acquisition unit configured to acquire a probability distribution of a color in a teacher image group; a generation unit configured to generate, as an artificial teacher image, an image having a color sampled based on the probability distribution; and a learning unit configured to perform learning of a learning model for performing a demosaicking inference, by using the artificial teacher image.

According to the second aspect of the present invention, there is provided an image processing method, comprising: acquiring a probability distribution of a color in a teacher image group; generating, as an artificial teacher image, an image having a color sampled based on the probability distribution; and performing learning of a learning model for performing a demosaicking inference, by using the artificial teacher image.

According to the third aspect of the present invention, there is provided a non-transitory computer-readable storage medium storing a computer program for causing a computer to function as: an acquisition unit configured to acquire a probability distribution of a color in a teacher image group; a generation unit configured to generate, as an artificial teacher image, an image having a color sampled based on the probability distribution; and a learning unit configured to perform learning of a learning model for performing a demosaicking inference, by using the artificial teacher image.

According to the fourth aspect of the present invention, there is provided an image processing apparatus for generating learning data to be used in machine-learning, the apparatus comprising: an acquisition unit configured to acquire a first teacher image group included in the learning data; and a generation unit configured to generate a second teacher image group based on the first teacher image group, wherein the first teacher image group has a first luminance distribution and a first hue distribution, the second teacher image group has a second luminance distribution and a second hue distribution, and the generation unit generates the second teacher image group so that a difference between the first hue distribution and the second hue distribution is larger than a difference between the first luminance distribution and the second luminance distribution.

The present invention provides a technique for suppressing the occurrence of artifacts in a demosaicking inference result even when inferring demosaicking for an image having a hue that is difficult to infer.

Further features of the present invention will become apparent from the following description of exemplary embodiments with reference to the attached drawings.

BRIEF DESCRIPTION OF THE DRAWINGS

FIG. 4A is a block diagram illustrating an example of a function configuration of the image processing apparatus 100.

FIG. 4B is a block diagram illustrating an example of a function configuration of a statistical processing unit 402.

FIG. 4C is a block diagram illustrating an example of a function configuration of a processing unit.

FIG. 5 is a flowchart corresponding to a first embodiment.

DESCRIPTION OF THE EMBODIMENTS

Figure 1:
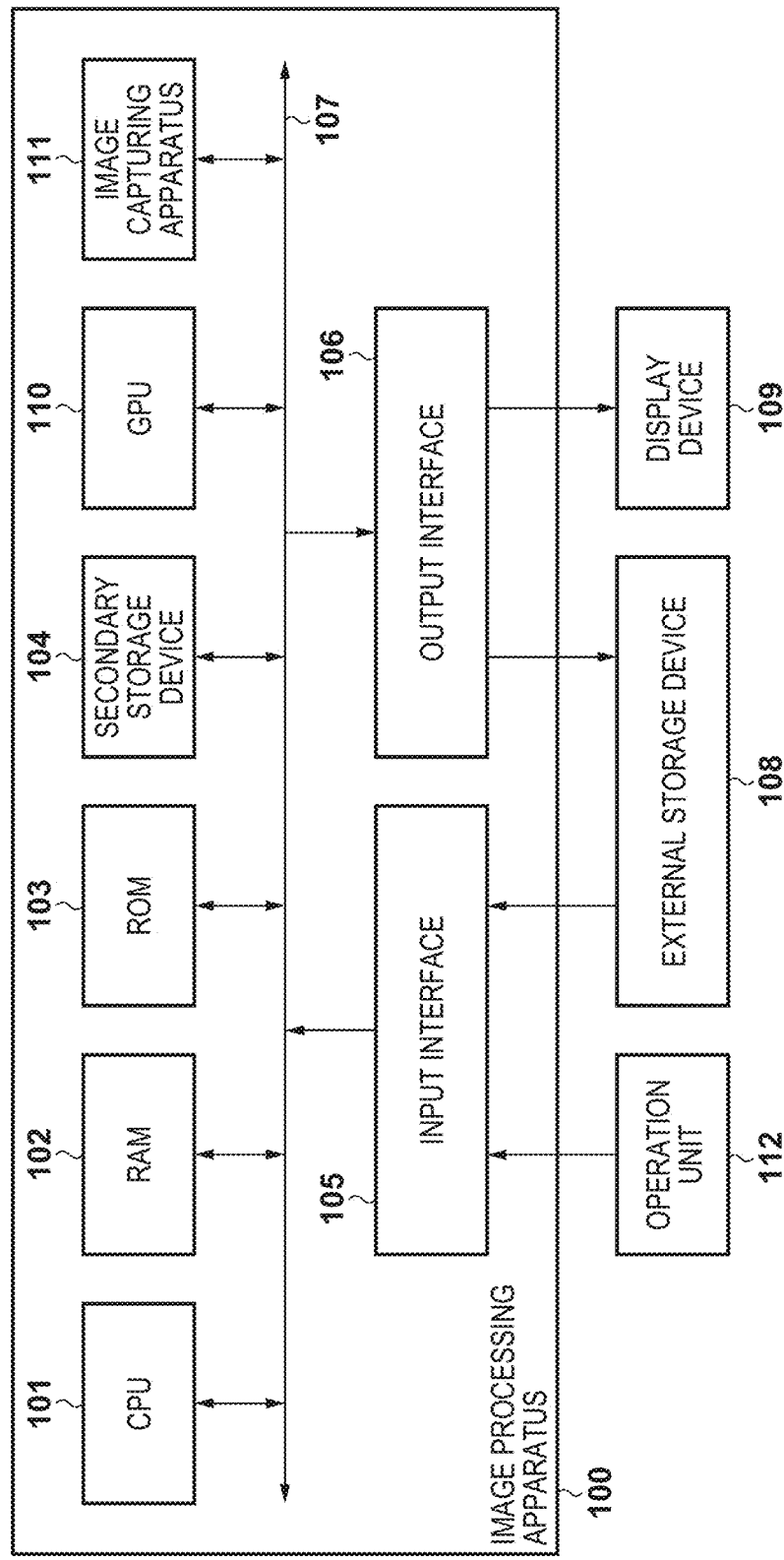
FIG. 1 is a block diagram illustrating an example of a hardware configuration of an image processing apparatus 100.
Figure 2:
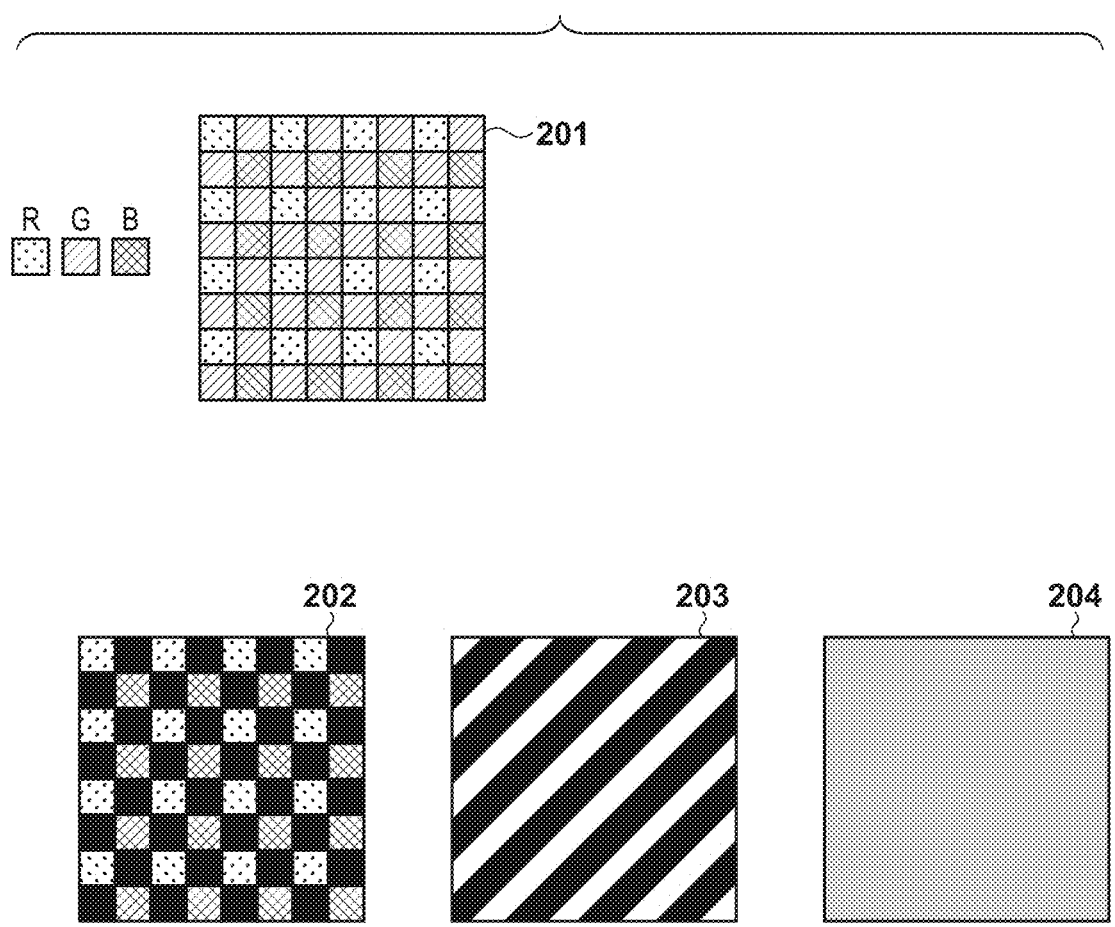
FIG. 2 is a diagram illustrating a principle of artifact generation in the prior art.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, artificial teacher images, which are artificial teacher images with reduced hue bias, are generated, and learning is performed using the artificial teacher images as learning data, thereby reducing artifacts of mosaic image demosaicking inference results.
(Principle of Artifact Generation and Countermeasures)

First, the principle by which artifacts occur in the prior art will be described with reference to FIG. 2 and FIGS. 3A through 3D. A mosaic image (here, a Bayer image) is an image in which pixels of three colors—R (red), G (green), and B (blue)—are arranged according to a color filter arrangement 201. Here, consider a case where an object 204 with a magenta surface is captured. At this time, in the mosaic image obtained by imaging, the pixel values of R and B are large, and pixel values of G are small, i.e., large pixel values and small pixel values are alternately arranged in a checkerboard-pattern mosaic image 202. It can be seen that in this mosaic image 202, pixels with large pixel values are arranged diagonally from the upper right to the lower left. That is, even when imaging a subject 203 which has a diagonal stripe pattern, the mosaic image 202 is acquired.

When the mosaic image 202 is inputted to the CNN and the demosaicking inference is performed, it is difficult to uniquely determine the result of the inference because the mosaic image 202 can correspond to both the subject 203 (a pattern image) and the subject 204 (a magenta image). Outputting the result of where the two images (pattern image, magenta image) which are candidates of the result of the inference are alpha blended according to their likelihoods can be considered. Therefore, even when the correct image was the subject 204 (magenta image), the subject 203 (pattern image) is output superimposedly, which is perceived as a false pattern artifact.

Thus, the magenta image is difficult to infer due to the characteristics of the color filter array. In other words, depending on the characteristics of the color filter array, there are hues that are difficult to infer. Though the correct inference of the image of such hue is difficult when referring to a local region like the subject 203 (pattern image), the correct inference can become possible if the consistency with the periphery is considered by referring to a wider area. In order to effectively utilize wide-area image features, a large number of teacher images are required at the time of learning, and a large number of teacher images of that hue are required. However, hue data will not necessarily be collected sufficiently if the total number of teacher images is simply increased.

Figure 3A:
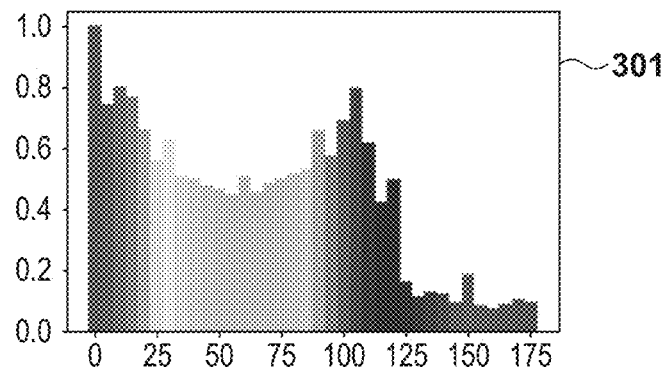
FIGS. 3A through 3D are views for describing a principle of artifact generation in the prior art.
Figure 3B:
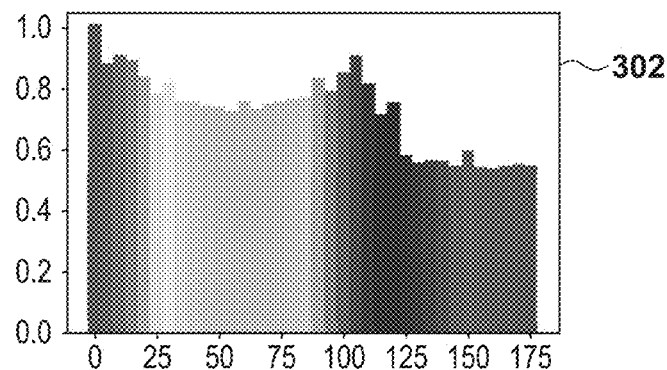
Figure 3C:
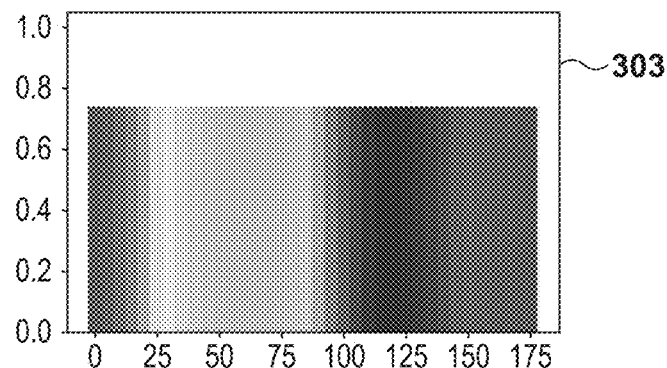

FIG. 3A illustrates examples of histograms (hue distributions) generated by converting a color space of a group of teacher images obtained from the natural world from an RGB color space to an HSV color space and extracting only hue (H) values. The horizontal axis represents the position of the hue on the spectrum and is represented by an angle of 0 to 180 degrees. The vertical axis represents the appearance frequency of each hue. From the hue distributions in FIG. 3A, it can be seen that a hue of 150 degrees corresponding to magenta images is smaller than other hues. As described above, there is a bias towards hues existing in the natural world, and the number of images with difficult hues may be insufficient. As a countermeasure, an artificial teacher image, which is obtained by equalizing all hues, is generated as illustrated in FIG. 3C, and this artificial teacher image is used for learning as learning data.

Figure 3D:
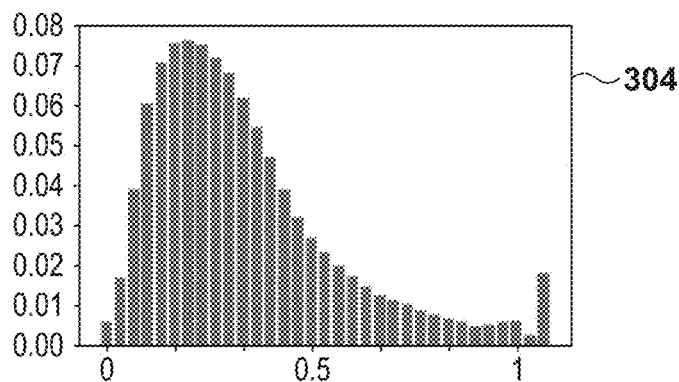

When generating an artificial teacher image, it is necessary to determine not only the hue but also the luminance of the artificial teacher image. Luminance is different from hue, and is not difficult to infer due to the characteristics of the color filter array. Therefore, it is better to determine the luminance of the artificial teacher image in accordance with what mosaic image luminance distribution (pixel value distribution) could be inputted into the CNN at the time of inference. FIG. 3D is a histogram (luminance distribution) generated by extracting only the luminance (V) value for the same teacher image group as FIG. 3A, and the luminance is determined based on this.

As described above, in the present embodiment, in order to cope with artifacts, an artificial teacher image is generated and learning is performed. Then, when determining pixel values of the artificial teacher image, luminance values are determined so as to be equal to the luminance distribution of the teacher image group, and hue values are determined according to the distribution such that the bias becomes smaller than the hue distribution of the teacher image group.
(Configuration of Image Processing Apparatus)

First, an example of a hardware configuration of the image processing apparatus 100 according to the present embodiment will be described with reference to the block diagram of FIG. 1. The image processing apparatus 100 according to the present embodiment is applicable to a computer apparatus such as a PC (Personal Computer), a tablet terminal device, or a smart phone.

A CPU 101 executes various processes using computer programs and data stored in a RAM 102 or a ROM 103. As a result, the CPU 101 controls the operation of the entire image processing apparatus 100, and executes or controls the processes described as being performed by the image processing apparatus 100.

The RAM 102 includes an area for storing computer programs and data loaded from the ROM 103, a secondary storage device 104, an external storage device 108, and the like, and an area for storing information such as an input image (RAW image) outputted from an image capturing apparatus 111. In addition, the RAM 102 has a work area used by the CPU 101 or a GPU 110 to perform various operations. In this way, the RAM 102 can provide various areas as appropriate.

The ROM 103 stores setting data of the image processing apparatus 100, a computer program and data related to starting the image processing apparatus 100, and a computer program and data related to basic operations of the image processing apparatus 100.

The secondary storage device 104 is non-volatile memory, such as a hard disk drive. The secondary storage device 104 stores an OS (operating system), computer programs or data for the CPU 101 or the GPU 110 to execute or control various kinds of process to be described as being performed by the image processing apparatus 100, and the like. The computer programs and data stored in the secondary storage device 104 are loaded into the RAM 102 as appropriate under the control of the CPU 101 and processed by the CPU 101 or the GPU 110. In addition to a hard disk drive, various storage devices such as an optical disk drive and a flash memory can be used as the secondary storage device 104.

The GPU 110 operates based on a computer program or data loaded into the RAM 102, performs various arithmetic processing on data received from the CPU 101, and notifies the CPU 101 of the result of the calculations.

The image capturing apparatus 111 has an image capturing element to which a color filter having an arrangement such as a Bayer arrangement is mounted, and outputs a RAW image outputted from the image capturing element to a system bus 107.

An input interface 105 is a serial bus interface such as USB or IEEE1394. The image processing apparatus 100 acquires data, instructions, and the like from the outside via the input interface 105.

An output interface 106 is a serial bus interface such as USB or IEEE1394, similarly to the input interface 105. The output interface 106 may be a video output terminal such as DVI or HDMI (registered trademark). The image processing apparatus 100 outputs data, and the like to the outside via the output interface 106.

All of the CPU 101, the RAM 102, the ROM 103, the secondary storage device 104, the GPU 110, the image capturing apparatus 111, the input interface 105, and the output interface 106 are connected to the system bus 107.

An operation unit 112 is a user interface such as a keyboard, a mouse, or a touch panel, and the operation device 112 allows various instructions to be inputted to the CPU 101 through the input interface 105 when operated by a user.

The external storage device 108 is a memory device connected to/mounted to the image processing apparatus 100 such as a hard disk drive, a memory card, a CF card, an SD card, or a USB memory. A computer program or data read from the external storage device 108 is inputted to the image processing apparatus 100 through the input interface 105 and stored in the RAM 102 or the secondary storage device 104. Computer programs and data stored in the external storage device 108 are written to the external storage device 108 through the output interface 106.

The display device 109 has a liquid crystal screen or a touch panel screen, and displays a result of a process performed by the CPU 101 or the GPU 110 in images, characters, or the like. The display device 109 may be a projection device such as a projector for projecting an image or characters.

Note that the configuration illustrated in FIG. 1 is only one example of the configuration of an apparatus capable of realizing each process described below, and the configurations capable of realizing each process described below are not limited to the configuration illustrated in FIG. 1. For example, in FIG. 1, the image capturing apparatus 111 is incorporated in the image processing apparatus 100 as a built-in device of the image processing apparatus 100. However, the present invention is not limited to this, and for example, the image capturing apparatus 111 may be connected to the input interface 105 as an external apparatus of the image processing apparatus 100.

In the present embodiment, the image processing apparatus 100 operates as follows by executing an image processing application. That is, the image processing apparatus 100 divides an input image (RAW image) outputted from the image capturing apparatus 111 to generate a plurality of pixel blocks, and generates a plurality of inference result blocks by performing a demosaicking inference for each of the plurality of pixel blocks. The image processing apparatus 100 combines the respective inference result blocks to generate a combined image having the same size as the input image.

(Regarding CNNs)

In the present embodiment, demosaicking for pixel blocks is inferred using a CNN (Convolutional Neural Network). CNNs, which are generally employed in image processing techniques that applying deep learning techniques such as Deep Joint Demosaicking and Denoising, Siggraph Asia, 2016, will be described here.

A CNN is used in learning image processing techniques that repeat nonlinear operations after convolving filters generated by learning (training) against images. Filters are also referred to as Local Receptive Fields (LRFs). An image obtained by convolving filters with respect to an image and then performing a nonlinear operation is called a feature map. Further, learning is performed using learning data (training images or data sets) consisting of input image/output image pairs. Briefly, learning generates, from learning data, values of filters that can accurately convert from an input image to a corresponding output image. Details thereof will be described later.

If the image has RGB color channels, or if the feature map consists of a plurality of images, the filter used for convolution will also have a plurality of channels accordingly. That is, a convolution filter is represented by a four-dimensional array, in which the number of channels is applied in addition to the vertical and horizontal sizes and the number of sheets. The process of convolving filters into images (or feature maps) and then performing nonlinear operations is expressed in units of layers. For example, a feature map is referred to as of the n-th layer, and a filter is referred to as of the n-th layer, or the like. Further, for example, a CNN in which filter convolution and a nonlinear operation are repeated three times is said to have a three-layer network structure. This process can be formulated as the following Equation (1).

$$X_n^{(l)} = G(\Sigma_{k=1}^{K} W_n^{(l)} * X_{n-1}^{(l)} + b_n^{(l)}) \tag{1}$$

In Equation (1), Wn is a filter of the n-th layer, bn is a bias of the n-th layer, G is a nonlinear operator, Xn is a feature map of the n-th layer, and * is a convolution operator. Note that (1) of the right superscript represents an l-th filter or feature map. The filters and biases are generated by learning, which will be described later, and are collectively referred to as network parameters. For a nonlinear operation, for example, a sigmoid function and an ReLU (Rectified Linear Unit) are used. The ReLU is given by the following Equation (2).

$$G(X) = \begin{cases} X & \text{if } 0 \leq X \\ 0 & \text{otherwise} \end{cases} \quad (2)$$

In other words, it is nonlinear process where the negative elements of the inputted vector X are set to zero, and positive elements are left as is. Next, CNN learning will be described. CNN learning is generally performed by minimizing an objective function represented by the following Equation (3) with respect to learning data consisting of input learning image (student image) and corresponding output learning image (teacher image) sets.

$$L(\theta) = \frac{1}{n}\sum_{i=1}^{n} \|F(X_i;\theta) - Y_i\|_2^2 \quad (3)$$

L is a loss function that measures the error between the correct solution and its estimate. Yi is the i-th output learning image and Xi is the i-th input learning image. F is a function that collectively expresses Expression (1) performed in each layer of CNN. In addition, θ is a network parameter (a filter and a bias). In addition, $$\|Z\|_2$$

is the L2 norm, and is simply the square root of the sum of squares of the elements of the vector Z. In addition, n is the total number of learning data used for learning. However, since the total number of learning data is generally large, in the stochastic gradient descent method (SGD), a portion of learning images is randomly selected and used for learning. As a result, it is possible to reduce the computational load in learning using a large amount of learning data. Also, various methods such as a momentum method, an AdaGrad method, an AdaDelta method, and an Adam method are known as objective function minimization (=optimization) methods. The Adam method is given by the following Equation (4).

$$g = \frac{\partial L}{\partial \theta_i}$$
$$m = \beta_1 m + (1-\beta_1)g$$
$$v = \beta_2 v(1-\beta_2)g^2$$
$$\theta_i^{t+1} = \theta_i^t - \alpha \frac{\sqrt{1-\beta_2^t}}{(1-\beta_1^t)} \frac{m}{(\sqrt{v}+\varepsilon)} \quad (4)$$

In Equation (4), $\theta_i^t$ is the i-th network parameter at the t-th iteration, and g is the slope of the loss function L for $\theta_i^t$. In addition, m and v are moment vectors, α is a base learning rate, β1 and β2 are hyperparameters, and ε is a small constant. Since there is no guideline for selecting an optimization method in learning, basically anything may be used, but it is known that a difference in learning time occurs because there is a difference in convergence for each method.

As networks using CNNs, ResNet in the image recognition field and RED-Net which applies it in the super-resolution field are well-known. In all cases, the CNN is made to be multilayer, and filter convolution is carried out many times, to attempt to improve precision of the process. For example, ResNet is characterized by a network structure in which a path for shortcutting a convolution layer is provided, thereby realizing a multilayered network of 152 layers, and realizing high-precision recognition approaching a human recognition rate. Incidentally, the reason why precision is improved in the processing by the multi-layer CNN is that simply by repeating the nonlinear operation many times, it is possible to express the nonlinear relationship between the input and output.

The CNN according to the present embodiment is a learned CNN for which learning was performed to output a demosaicking inference result (an inference result block) for a pixel block when the pixel block is inputted.

(Example of Functional Configuration of Image Processing Apparatus)

An exemplary functional configuration of the image processing apparatus 100 is illustrated in a block diagram of FIG. 4A. Further, the demosaicking inference learning by the image processing apparatus 100 (learning the CNN that performs the inferring of the demosaicking) will be described in accordance with the flowchart of FIG. 5. Note that in FIG. 5, step S501 to step S507 is processing relating to demosaicking inference learning by the image processing apparatus 100, and steps S508 to S509 are demosaic processing by a processing apparatus other than the image processing apparatus 100. Note that steps S508 to S509 are not limited to being performed by a processing device other than the image processing apparatus 100, and the image processing apparatus 100 may perform demosaicking processing of steps S508 to S509. In the present embodiment, the hardware configuration of the processing apparatus is the same as that of the image processing apparatus 100 (that is, the hardware configuration has the configuration illustrated in FIG. 1), but it may be different from that of the image processing apparatus 100. An exemplary functional configuration of the processing apparatus is illustrated in a block diagram of FIG. 4C.

Hereinafter, the respective functional units illustrated in FIGS. 4A, 4B, and 4C will be described as the performers of the process. However, in practice, the functions of the functional units are realized by causing the CPU 101 or the GPU 110 to execute a computer program for executing the function of the functional unit on the CPU 101 or the GPU 110. One or more of the functional units illustrated in FIGS. 4A, 4B, and 4C may be implemented by hardware.

Figure 8:
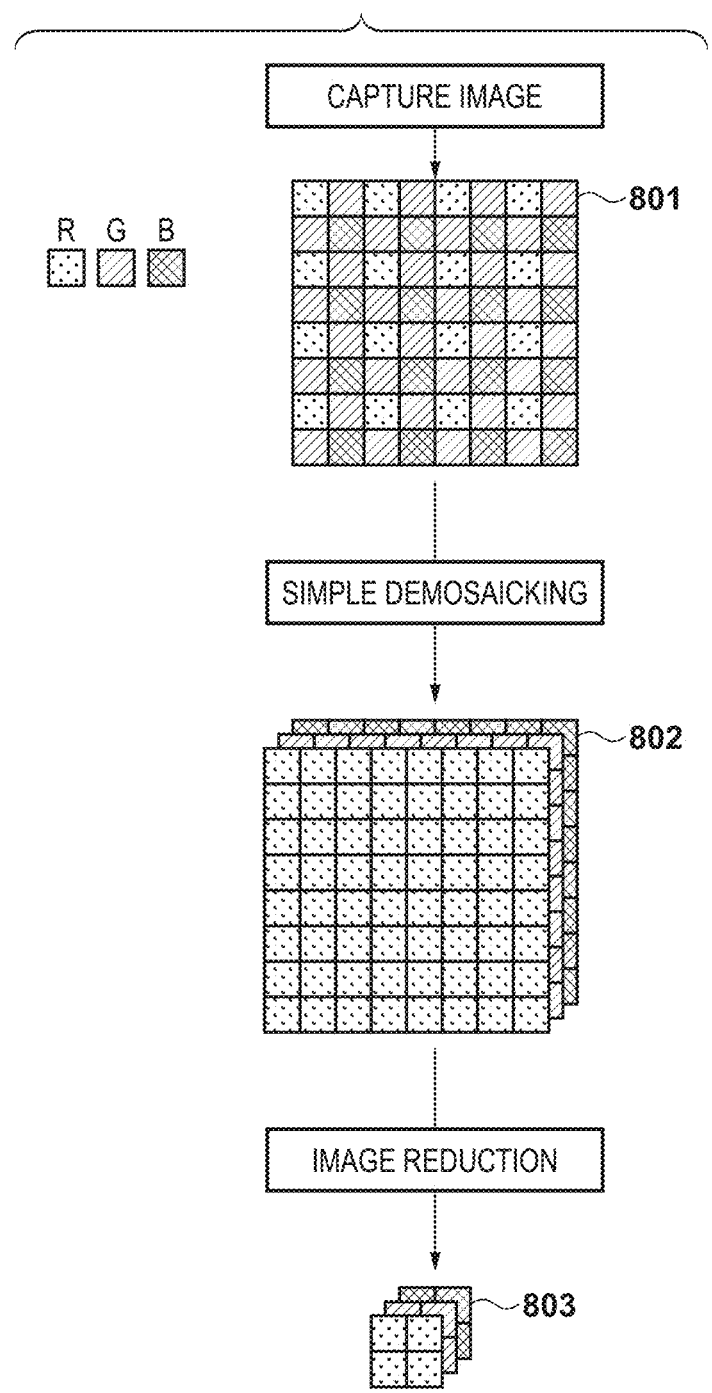
FIG. 8 is a diagram for explaining step S501.

In step S501, an acquisition unit 401 acquires a plurality of teacher images, each of which is an image (an image of an RGB format) whose pixels have RGB pixel values. For example, the acquisition unit 401 acquires a teacher image in accordance with the method disclosed in Deep Joint Demosaicking and Denoising, Siggraph Asia, 2016. Specifically, as illustrated in FIG. 8, the acquisition unit 401 generates an RGB image 802 by applying simple demosaicking to a mosaic image 801 obtained by image capturing by the image capturing apparatus 111, and generates a reduced image obtained by reducing the RGB image 802 as a teacher image 803. Simple demosaicking uses bilinear interpolation, but other demosaicking techniques may be used. Although a Bayer arrangement is illustrated here as a color filter arrangement of the image capturing element in the image capturing apparatus 111, another color filter arrangement such as an X-Trans may be used.

The method of acquiring the teacher image described above is only one example, and the method of acquiring the teacher image by the acquisition unit 401 is not limited to a specific acquisition method. For example, the acquisition unit 401 may generate a teacher image by a method other than the method disclosed in Deep Joint Demosaicking and Denoising, Siggraph Asia, 2016. Further, for example, a teacher image generated in advance by some method may be stored in advance in the secondary storage device 104 or the external storage device 108. In this case, the acquisition unit 401 may read out a teacher image stored in the secondary storage device 104 or may read out a teacher image stored in the external storage device 108 through the input interface 105. Further, a teacher image generated in advance by some method may be registered in an external device connected to the image processing apparatus 100 via a network (wired/wireless network such as the Internet or a LAN). In this case, the acquisition unit 401 may acquire the teacher image from the external device via the network. Further, an image in RGB format may be obtained as a teacher image by imaging while shifting the position of the image capturing element of the image capturing apparatus 111. As described above, any acquisition method may be employed, and in step S501, the acquisition unit 401 acquires a plurality of teacher images (teacher image group) by any acquisition method.

In step S502, a statistical processing unit 402 performs statistical analysis on the plurality of teacher images acquired in step S501, thereby acquiring statistics for each of the channels (hue (H), saturation (S), and luminance (V)). Here, the process in step S502 will be described in detail. An exemplary functional configuration of the statistical processing unit 402 is illustrated in a block diagram of FIG. 4B.

The statistic computing unit 410 converts the pixel values of each pixel in the teacher image into pixel values (a hue (H) pixel value, a saturation (S) pixel value, and a luminance (V) pixel value) in the HSV color space for each of the plurality of teacher images acquired in step S501.

Based on the pixel values of the hue (H) collected from all the teacher images acquired in step S501, a statistic computing unit 410 generates a histogram of the pixel values of the hue (H) (for example, a histogram representing the number of pixels corresponding to each hue (H) in steps of five degrees).

Based on the pixel values of saturation (S) collected from all the teacher images acquired in step S501, a statistic computing unit 410 generates a histogram of the pixel values of saturation (S) (for example, a histogram representing the number of pixels corresponding to each saturation (S) in steps of five %).

Based on the pixel values of the luminance (V) collected from all the teacher images acquired in step S501, a statistic computing unit 410 generates a histogram of the pixel values of the luminance (V) (for example, a histogram representing the number of pixels corresponding to each luminance (V) in steps of five %).

Next, the calculation unit 411 converts the histogram $v_H$ of the pixel values of the hue (H), the histogram vs of the pixel values of the saturation (S), the histogram $v_V$ of the pixel values of the luminance (V), each of the probability distribution function according to the following Equation (5).

$$p_c(x) = \frac{v_c(x)}{\sum_x v_c(x)} \quad (5)$$

$(c \in \{H, S, V\})$

Here, $p_c(x)$ is a probability distribution function representing the occurrence probability of the class x in the channel c, and $v_c(x)$ is a histogram representing the frequency of the class x in the channel c.

Here, the probability distribution function is calculated by actual measurement from the teacher image group, but may be obtained by other methods. For example, the statistic computing unit 410 may obtain the average μ and the variance σ of the pixel values in each channel from the teacher image group acquired in step S501. Then, for each channel, the calculation unit 411 may obtain a Gaussian distribution G(μ, σ) according to the average μ and variance σ obtained for the channel as a probability distribution function of the channel. Further, the average of the Gaussian distribution may be another statistic such as a mode value or a median value of the teacher image group, or may be fitted to a probability distribution function other than a Gaussian distribution. Further, processing such as smoothing, shifting, and linear transformation may be performed on the obtained probability distribution function.

Next, the distribution correction unit 412 performs correction on the probability distribution function $p_H$ of the hue (H) such that the variance in the probability distribution function $p_H$ becomes large. A distribution correction unit 412 corrects the probability distribution function $p_H$ of the hue (H) according to the following Equation (6) using, for example, the coefficients t and u which are set in advance.

$$p_H(x) \leftarrow t p_H(x) + u \quad (6)$$

By such a correction, a new probability distribution function $p_H$ can be obtained. Note that a uniform probability distribution function $p_H$ may be obtained by setting t=0. The processing by the statistical processing unit 402 described above will be described using FIGS. 3A through 3D as an example; first a histogram is obtained for each channel such as the histogram 301 for pixel values of the hue (H) and the histogram 304 for pixel values of luminance (V). Then, the probability distribution function 302 obtained by correcting the probability distribution function obtained by converting the histogram, and a uniform probability distribution function 303 where t=0 are obtained.

The correction method for correcting the probability distribution function described above is only one example, and there is no limitation to a specific correction method. For example, smoothing may be applied to $p_H(x)$ or its variance may be increased after fitting to a Gaussian distribution. A similar correction as the above described correction may or may not be performed on the probability distribution function $p_S$ of the saturation (S).

In step S503, the generation unit 403 generates a plurality of artificial teacher images based on the statistics (probability distribution function $p_H$ of hue (H), probability distribution function $p_S$ of saturation (S), and probability distribution function $p_V$ of luminance (V)) acquired for each of the channels in step S502. Hereinafter, processing for generating one artificial teacher image will be described.

First, the generation unit 403 selects an object according to a specified rule or randomly from an object database stored in the secondary storage device 104 or the external storage device 108. The object database is a database in which objects (objects of simple shapes) such as shapes, symbols, characters, and repetitive patterns are stored. The generation unit 403 generates an image using the selected object as a foreground (that is, the region other than the object region is the background of the image) as an artificial teacher image. At this time, the generation unit 403 determines the respective colors of the foreground and the background in the artificial teacher image based on a probability distribution function $p_c$ (c=H, S, V). First, the generation unit 403 samples the probability variable $x_c$ according to the probability distribution function $p_c(x)$ as follows.

$$x_c \sim p_c(x)(c \in \{H, S, V\}) \quad (7)$$

That is, the generation unit 403 samples the probability variable $x_H$ according to the probability distribution function $p_H(x)$, samples the probability variable $x_S$ according to the probability distribution function $p_S(x)$, and samples the probability variable $x_V$ according to the probability distribution function $p_V(x)$. The generation unit 403 sets the value of the probability variable $x_H$ to the pixel value of the foreground hue (H), sets the value of the probability variable $x_S$ to the pixel value of the foreground saturation (S), and sets the value of the probability variable $x_V$ to the pixel value of the foreground luminance (V).

The same processing is performed for the background. That is, the generation unit 403 samples the probability variable $x_H$ according to the probability distribution function $p_H(x)$, samples the probability variable $x_S$ according to the probability distribution function $p_S(x)$, and samples the probability variable $x_V$ according to the probability distribution function $p_V(x)$. Then the generation unit 403 sets the value of the probability variable $x_H$ to the pixel value of the background hue (H), sets the value of the probability variable $x_S$ to the pixel value of the background saturation (S), and sets the value of the probability variable $x_V$ to the pixel value of the background luminance (V).

In this manner, the generation unit 403 samples the probability variable xc according to the probability distribution function $p_c(x)$ for each of the foreground and the background, and sets the color corresponding to the sampled probability variable c. The generation unit 403 repeats the above processing a plurality of times to generate a plurality of artificial teacher images.

Figure 10:
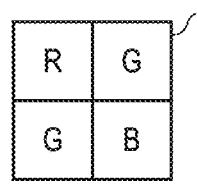
FIG. 10 is a diagram illustrating a process for generating a student image from an artificial teacher image.

Next, the generation unit 403 performs sub-sampling of pixel values for each of the generated plurality of artificial teacher images according to a color filter arrangement (a color filter arrangement of the image capturing apparatus 111 that captures a captured image that is a generation source of the artificial teacher image) from the artificial teacher image to generate a mosaic image (student image). Here, processing for generating a student image from an artificial teacher image will be described with reference to FIG. 10.

An R component image 1001 is an image of the R plane of the artificial teacher image (an image composed of pixel values of R components of each pixel in the artificial teacher image). A G component image 1002 is an image of the G plane of the artificial teacher image (an image composed of pixel values of G components of each pixel in the artificial teacher image). A B component image 1003 is an image of the B plane of the artificial teacher image (an image composed of pixel values of B components of each pixel in the artificial teacher image).

The generation unit 403 generates the student image 1004 arranged by subsampling pixel values according to the color filter array 1005 of the image capturing apparatus 111 from the R component image 1001, the G component image 1002, and the B component image 1003.

More specifically, when the student image 1004 is divided into four "regions of 2 pixels×2 pixels" (divided regions of the same size as the color filter array 1005) and the color filter array 1005 is superimposed on the respective divided regions, the pixels in the upper left corner correspond to the channel "R" in each divided region, the pixels in the upper right corner and the pixels in the lower left corner correspond to the channel "G", and the pixels in the lower right corner correspond to the channel "B". Therefore, for the pixel value of each pixel of the student image 1004, the generation unit 403 sets the pixel value corresponding to the pixel position of the pixel in the component image corresponding to the channel of the pixel among the three component images (R component image 1001, G component image 1002, and B component image 1003).

In this manner, the generation unit 403 generates a student image for each of the plurality of artificial teacher images, thereby generating a plurality of image sets of an artificial teacher image and a student image generated based on the artificial teacher image.

It is preferable that the object includes at least one or more connected regions having about the same pixel value, that the size of each connected region is larger than the filter size of CNN, and that the hue histogram of all connected regions has a bimodal shape. Further, it is not a problem if noise is added. Importantly, there are many variations in the two types of border (edge) hue shapes assigned to each connected region.

Figure 9A:
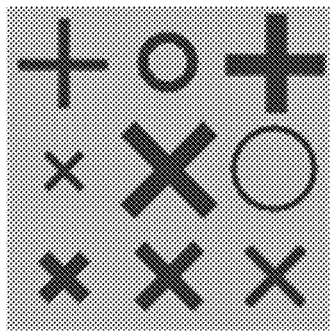
FIGS. 9A to 9C is a diagram illustrating examples of artificial teacher images.
Figure 9B:
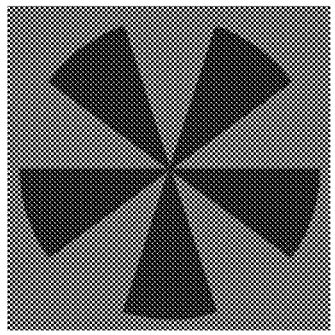
Figure 9C:
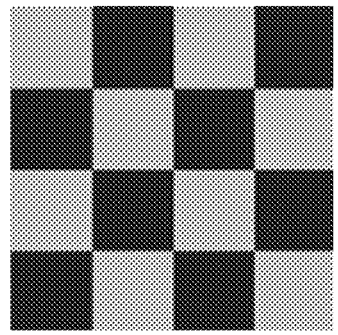

Examples of artificial teacher images are illustrated in FIGS. 9A to 9C. FIG. 9A illustrates an example of an artificial teacher image generated where symbols are selected as objects, and FIG. 9B illustrates an example of an artificial teacher image generated where a graphic is selected as an object. Further, FIG. 9C illustrates an example of an artificial teacher image generated where a repetitive pattern is selected as an object.

Next, in step S504, an acquisition unit 404 acquires a parameter (network parameter) defining the CNN. The network parameters include the coefficients of each filter in the CNN. The network parameters are set as a random number according to the normal distribution of He. The normal distribution of He is a normal distribution in which the average is 0 and the variance is $\sigma_h$ described below.

$$\sigma_h = \sqrt{\frac{2}{m_N}} \quad (8)$$

$m_N$ denotes the number of neurons in the filter in the CNN. The method of determining the network parameters is not limited to the above method, and other determination methods may be employed. Other types of parameters may be acquired as network parameters instead of or in addition to the coefficients of the respective filters.

The method of acquiring network parameters is not limited to a specific acquisition method. For example, the acquisition unit 404 may read the network parameters stored in the secondary storage device 104 or may read the network parameters stored in the external storage device 108 through the input interface 105. Further, the network parameters may be registered in an external device connected to the image processing apparatus 100 via a network (wired/wireless network such as the Internet or LAN). In this case, the acquisition unit 404 may acquire the network parameters from the external device via the network. As described above, any acquisition method may be employed, and in step S504, the acquisition unit 404 acquires the network parameters by any acquisition method.

Figure 11:
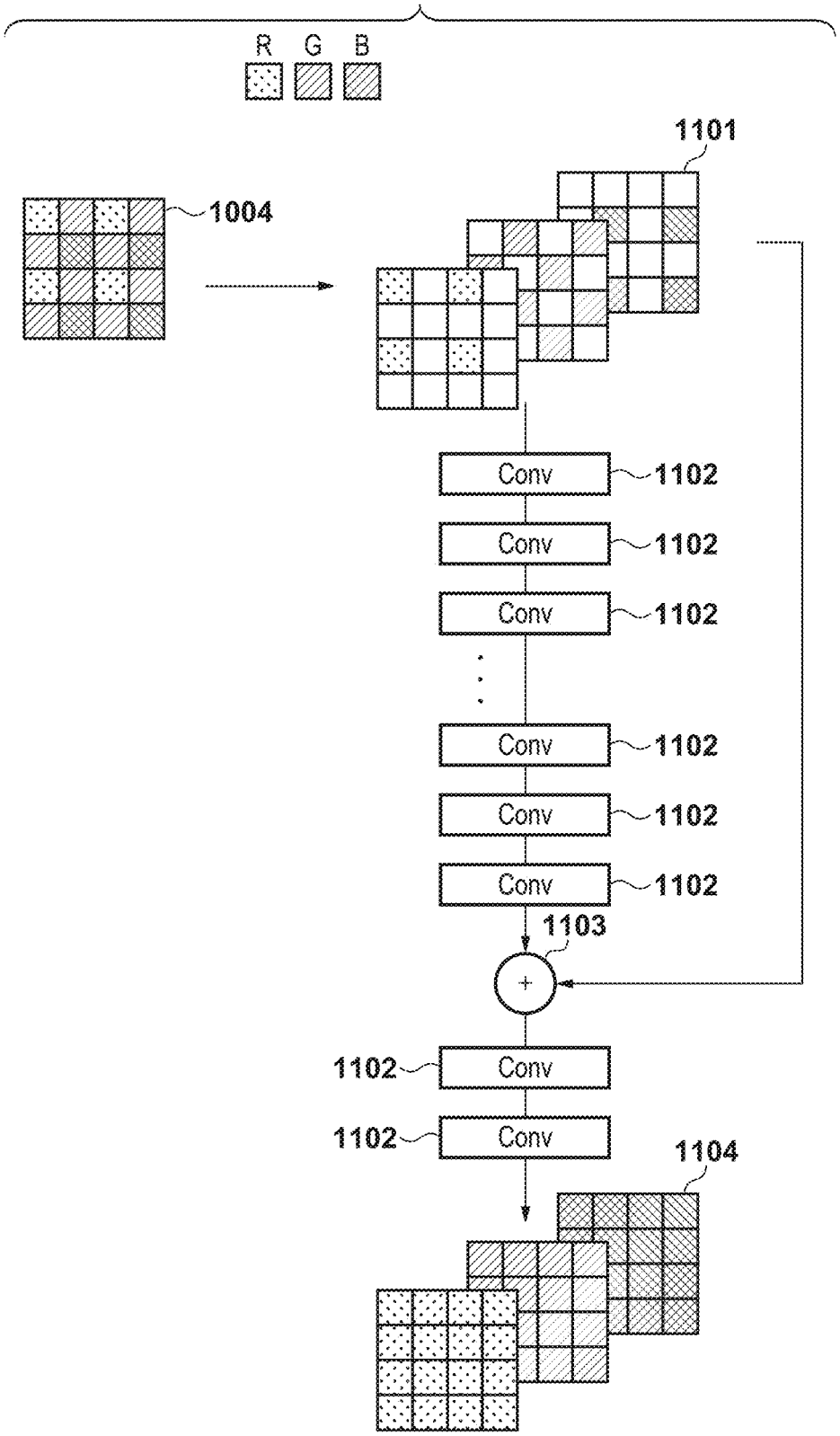
FIG. 11 is a diagram illustrating a structure of a CNN and a flow of learning.

In step S505, the learning unit 405 configures the CNN according to the network parameters acquired in step S504, and initializes the weights of the CNN. Then, the learning unit 405 uses the plurality of sets of images generated in step S503 as learning data, and performs learning of a "CNN for inferring demosaicking". In the learning, the CNN disclosed in Deep Joint Demosaicking and Denoising, Siggraph Asia, 2016 is used. The structure of the CNN and the flow of learning will be described with reference to FIG. 11.

The CNN includes a plurality of filters 1102 for performing the operation of Equation (1). When inputting the student image 1004 to this CNN, this is converted into a missing image 1101 for the three channels. In the missing image 1101 of the R channel, only the pixels of the R component of the student image 1004 are included, and the pixel values of the other pixels are set to a missing value (0). In the missing image 1101 of the G channel, only the pixels of the G component of the student image 1004 are included, and the pixel values of the other pixels are set to the missing value (0). In the missing image 1101 of the B channel, only the pixels of the B component of the student image 1004 are included, and the pixel values of the other pixels are set to a missing value (0). The missing values may be interpolated by a method such as bilinear interpolation. Next, the filter 1102 is sequentially applied to the missing image 1101 to calculate a feature map. Subsequently, a connection layer 1103 of the CNN connects the calculated feature map and the missing image 1101 in the channel direction. When the numbers of channels of the feature map and the missing image 1101 are n1 and n2 respectively, the number of channels of the connected result is (n1+n2). Subsequently, a filter 1102 is applied to the connection result, and the final filter 1102 outputs three channels, thereby obtaining an inference result 1104. Then, the remainder of the obtained inference result 1104 and the artificial teacher image corresponding to the student image 1004 is calculated, and the average of the remainder is obtained as a loss function value for all the image sets. Then, the CNN is learned by updating the network parameters from the loss function values by a back propagation method or the like. Such a series of CNN learning (updating of network parameters) is performed by the learning unit 405.

In step S506, an inspection unit 406 determines whether or not the condition for ending the learning is satisfied. For example, the inspection unit 406 acquires a mosaic image chart including an object such as a figure or a symbol having a statistically infrequent hue in an image group such as a landscape photograph or a person photograph that is not used for learning. Hues having a complementary color relationship such as green/magenta are particular examples of infrequent hues. In the present embodiment, such a mosaic image chart is created in advance and stored in the secondary storage device 104, the external storage device 108, or the like, and the inspection unit 406 acquires the mosaic image chart from the secondary storage device 104 or the external storage device 108. However, the method of acquiring the mosaic image chart is not limited to a specific acquisition method. Also, the inspection unit 406 generates a demosaicked image by demosaicking the mosaic image chart using the CNN according to the current network parameters. The inspection unit 406 determines that a "learning end condition is satisfied" when the degree of occurrence of an artifact in the demosaicked image is less than a threshold value, and determines that the "learning end condition is not satisfied" when the degree of occurrence of an artifact is equal to or greater than the threshold value.

The condition for ending the learning described here is only one example, and the present invention is not limited to this. For example, the condition for ending the learning may be that an "amount of change from the network parameters before updating to the network parameters after updating" is less than the threshold value. The condition for ending the learning may be that "a remainder between the inference result of the CNN and the artificial teacher image is equal to or less than the threshold value". Further, the learning end condition may be that the number of iterations of learning (updating of network parameters) reached a threshold. The learning end condition may be a combination of two or more conditions, and when all of the two or more conditions are satisfied, it may be determined that the learning end condition is satisfied.

As a result of the determination, when the condition for ending the learning is satisfied, the process proceeds to step S507. On the other hand, when the condition for ending the learning is not satisfied, the process proceeds to step S503, where a new group of artificial teacher images is generated and learning is performed again.

In step S507, the inspection unit 406 stores the newest network parameters updated by the learning unit 405 in the storage unit 407. It should be noted that the learning process of "inference of demosaicking results with respect to mosaic images" has been completed in step S507.

In step S508, the acquisition unit 408 acquires a mosaic image (RAW image) to be subjected to demosaicking as an input image. The method for acquiring the input image by the acquisition unit 408 is not limited to a specific acquisition method. For example, the acquisition unit 408 may control the image capturing apparatus 111 to acquire as an input image a RAW image that the image capturing apparatus 111 captured by the control. Further, for example, the acquisition unit 408 may acquire a RAW image stored in the secondary storage device 104 as an input image, or may acquire a RAW image stored in the external storage device 108 as an input image via the input interface 105. When a processing device 499 is connected to a network, such as the Internet or a wired/wireless network such as a LAN, the acquisition unit 408 may acquire a RAW image as an input image from an external device via the network.

In step S509, an inference unit 40) acquires the network parameters stored in the storage unit 407 from the image processing apparatus 100, and constructs a CNN that has already been learned based on the network parameters. The inference unit 409 inputs the input image acquired in step S508 into the learned CNN, and obtains the output of the learned CNN as an inference result image which is a demosaicking inference result for the input image. The inference unit 409 outputs the inference result image, but the output destination of the inference result image is not limited to a specific output destination.

For example, the inference unit 409 may display the inference result image on the display device 109 by outputting the inference result image to the display device 109 via the output interface 106. For example, the inference unit 409 may store the inference result image in the secondary storage device 104, or may output the inference result image to the external storage device 108 through the output interface 106 and store the inference result image in the external storage device 108. When a processing device 499 is connected to a network (such as the Internet or a wired/wireless network such as a LAN), the inference unit 409 may transmit an inference result image to an external device via the network.

Thus, by virtue of the present embodiment, the occurrence of artifacts in a demosaicking inference result can be suppressed even when inferring demosaicking for an input image having a hue that is difficult to infer.

<Variations>

In the first embodiment, the statistical processing unit 402 acquires a probability distribution function for each of H, S. and V color components from teacher image group, and sets foreground and background colors in an artificial teacher image based on the probability distribution function. However, the method of determining the foreground and background colors in the artificial teacher image is not limited to a specific determination method. In the present modification example, several examples of this determination method will be described. In the following, differences from the first embodiment will be described, and unless otherwise mentioned specifically, it should be assumed to be similar to the first embodiment.

Based on the R pixel values collected from all the teacher images acquired in step S501, a statistic computing unit 410 generates a "histogram of the pixel values of R" (for example, for steps of 5 (R pixel values), a histogram representing the number of pixels corresponding to each step). Based on the G pixel values collected from all the teacher images acquired in step S501, the statistic computing unit 410 generates a "histogram of G pixel values" (for example, for steps of 5 (G pixel values), a histogram representing the number of pixels corresponding to each step). Based on the B pixel values collected from all the teacher images acquired in step S501, the statistic computing unit 410 generates a "histogram of B pixel values" (for example, for steps of 5 (B pixel values), a histogram representing the number of pixels corresponding to each step).

Next, the calculation unit 411 converts the histogram $v_R$ of the pixel value of R to the probability distribution function $p_R(x)$ by the same conversion method as the above Equation (5). The probability distribution function $p_R(x)$ is a probability distribution function representing the occurrence probability of the class x in R.

Next, the calculation unit 411 converts the histogram $v_c$ of the pixel value of G to the probability distribution function $p_G$ by the same conversion method as the above Equation (5). The probability distribution function $p_G(x)$ is a probability distribution function representing the occurrence probability of the class x in G.

Next, the calculation unit 411 converts the histogram $v_B$ of the pixel value of B to the probability distribution function $p_B$ by the same conversion method as the above Equation (5). The probability distribution function $p_B(x)$ is a probability distribution function representing the occurrence probability of the class x in B.

The generation unit 403, similarly to the first embodiment, generates an image using a selected object as a foreground (the region other than the object region is the background of the image) as an artificial teacher image. At this time, the generation unit 403 determines the respective colors of the foreground and the background in the artificial teacher image based on a probability distribution function $p_c$ (c=R. G. B).

That is, the generation unit 403 samples the probability variable $x_R$ according to the probability distribution function $p_R(x)$, samples the probability variable $x_G$ according to the probability distribution function $p_G(x)$, and samples the probability variable $x_B$ according to the probability distribution function $p_B(x)$. The generation unit 403 sets the value of the probability variable $x_R$ to the R pixel value of the foreground, sets the value of the probability variable $x_G$ to the G pixel value of the foreground, and sets the value of the probability variable $x_B$ to the B pixel value of the foreground.

The same processing is performed for the background. That is, the generation unit 403 samples the probability variable $x_R$ according to the probability distribution function $p_R(x)$, samples the probability variable $x_G$ according to the probability distribution function $p_B(x)$, and samples the probability variable $x_B$ according to the probability distribution function $p_B(x)$. The generation unit 403 sets the value of the probability variable $x_R$ to the R pixel value of the background, sets the value of the probability variable $x_G$ to the G pixel value of the background, and sets the value of the probability variable $x_B$ to the B pixel value of the background.

As illustrated in the following Equation (9), the probability distribution function $p_R(x)$, the probability distribution function $p_G(x)$, and the probability distribution function $p_B(x)$ may be integrated into one probability distribution function $p(x)$, and $x_R$, $x_B$, and $x_G$ may be sampled based on the probability distribution function $p(x)$.

$$p(x) = \frac{1}{3} \sum_{c \in \{R,G,B\}} p_c(x) \tag{9}$$

$$x_c \sim p(x) \quad (c \in \{R, G, B\})$$

The method for calculating the probability distribution function is not limited to the above calculation method. For example, a probability distribution function in which each channel has a correlation may be obtained. The probability distribution function can be expressed, for example, as $p(x_R, x_G, x_B)$. In addition, the color space is not limited to the HSV color space or the RGB color space, and a color space such as the YUV color space, the L*a*b* color space, and the YCbCr color space may be used. In this case, the distribution correction unit 412 corrects the hue component and the color difference component so that variance becomes small.

Second Embodiment

Figure 12:
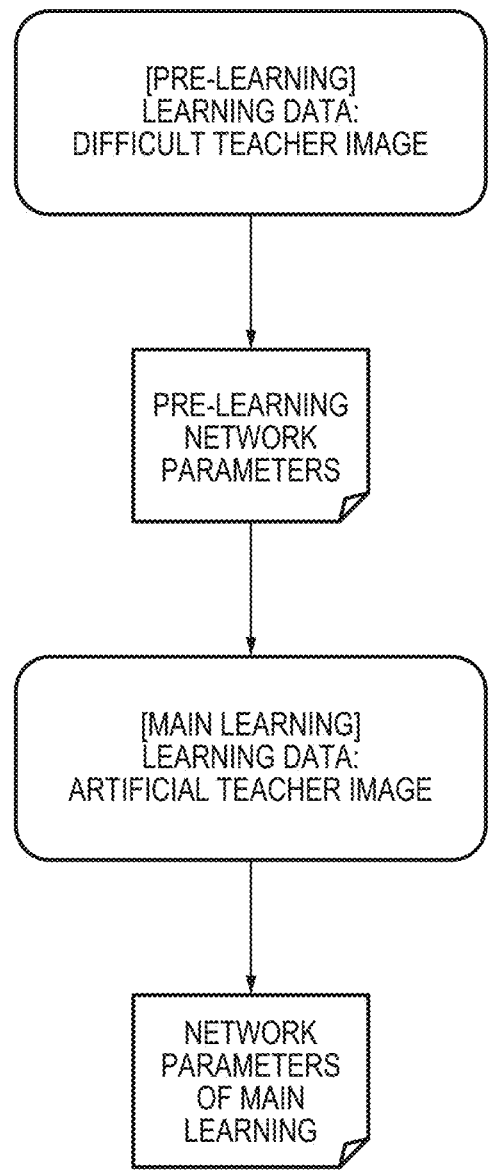
FIG. 12 is a diagram illustrating a flow of the second embodiment.

In the following, differences from the first embodiment will be described, and unless otherwise mentioned specifically, it should be assumed to be similar to the first embodiment. In the first embodiment, an example in which learning is performed using an artificial teacher image as learning data has been described. Learning using only artificial teacher images results in overlearning however, and robustness in regards to natural images (non-artificial images acquired by imaging in the real world) may suffer. Therefore, in the present embodiment, an example of learning demosaicking inferencing by using both difficult teacher images generated from natural images and artificial teacher images as learning data will be described. More specifically, in the present embodiment, as illustrated in FIG. 12, first, preliminary learning is performed using difficult teacher images generated from natural images as learning data, and network parameters of the CNN according to the preliminary learning are acquired. Then, using the CNN according to the "CNN network parameters according to the preliminary learning", the main learning is performed using the artificial teacher image as learning data, and the CNN network parameters of the main learning are acquired.

Figure 6:
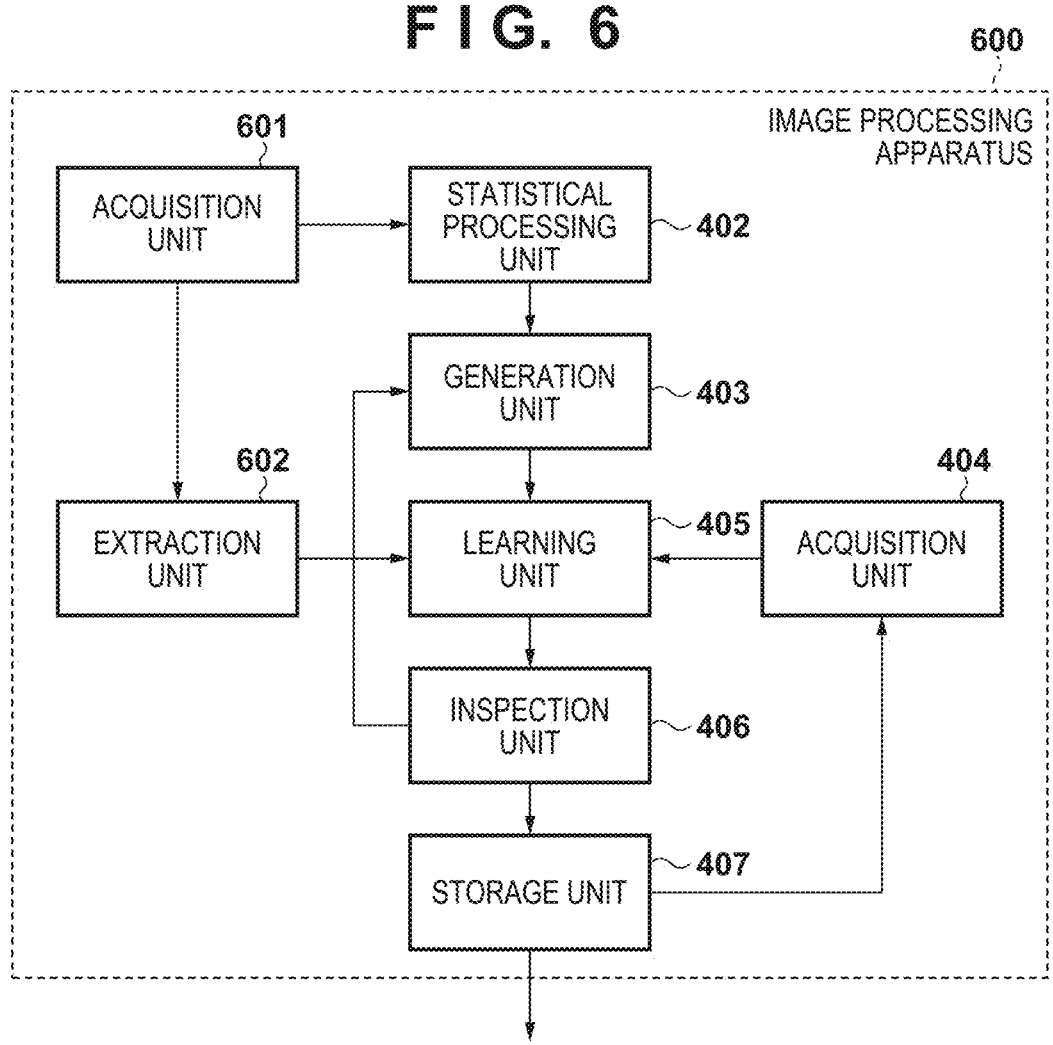
FIG. 6 is a block diagram illustrating an example of a function configuration of an image processing apparatus 600.
Figure 7:
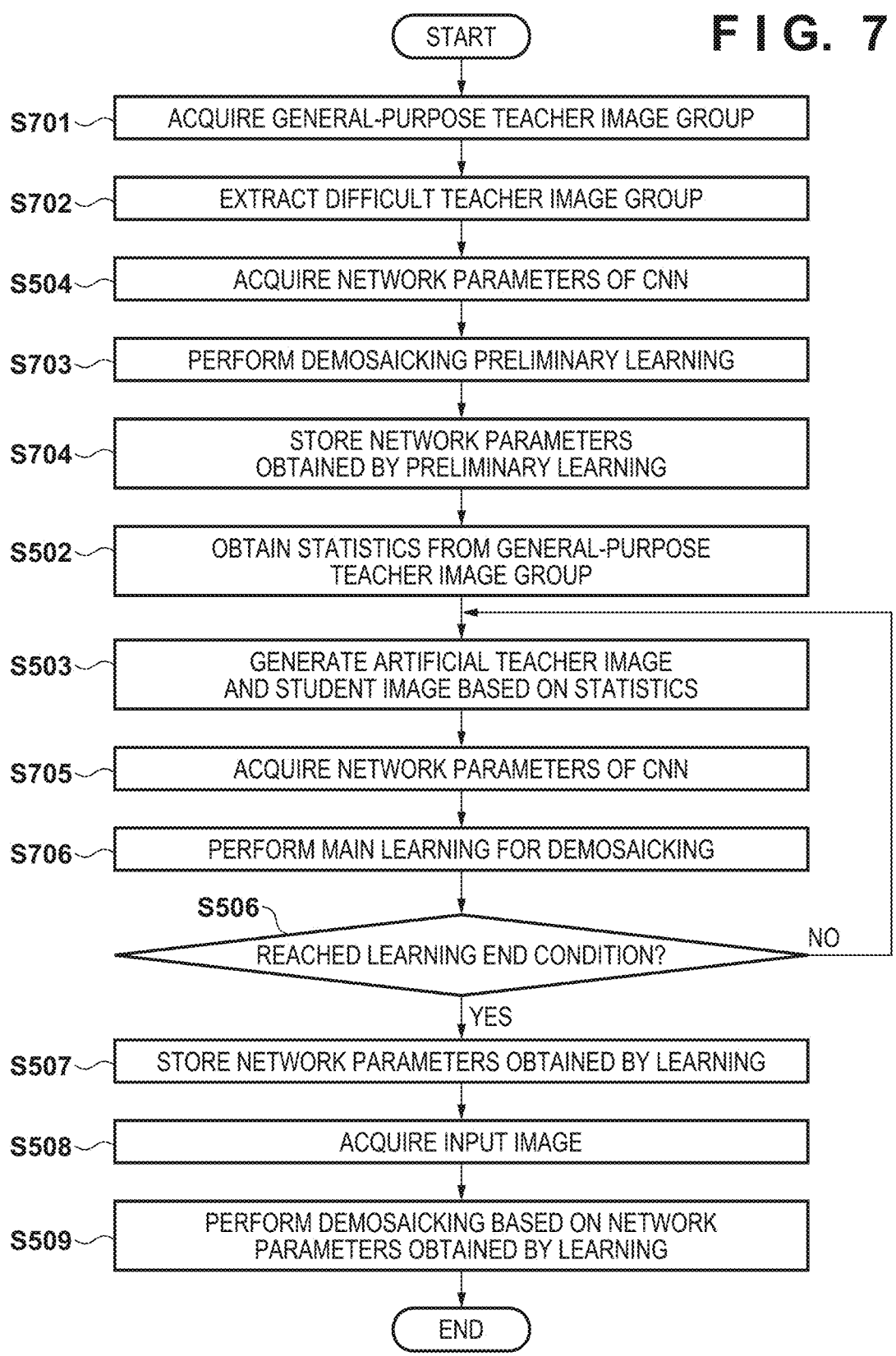
FIG. 7 is a flowchart corresponding to a second embodiment.

An exemplary functional configuration of the image processing apparatus 600 according to the present embodiment is illustrated in a block diagram of FIG. 6. Further, the demosaicking inference learning by the image processing apparatus 600 will be described in accordance with the flowchart of FIG. 7. In FIG. 7, steps S701, S702, S504, S703, S704, S502, S503, S705, S706, S506, and S507 are processing for learning demosaicking inferencing by the image processing apparatus 100. The steps S508 to S509 are demosaic processing by a processing device other than the image processing apparatus 600. Note that steps S508 to S509 are not limited to being performed by a processing device other than the image processing apparatus 600, and the image processing apparatus 600 may perform demosaicking processing of steps S508 to S509.

Hereinafter, the respective functional units illustrated in FIG. 6 will be described as the performers of the process. However, in practice, the functions of the functional units are realized by causing the CPU 101 or the GPU 110 to execute a computer program for executing the function of the functional unit on the CPU 101 or the GPU 110. One or more of the functional units illustrated in FIG. 6 may be implemented by hardware.

In step S701, the acquisition unit 601 acquires a general-purpose teacher image, which is a teacher image based on a natural image. The teacher image based on a natural image is a teacher image generated from a natural image, and the method for acquiring it may be an acquisition method similar to the method for acquiring the teacher image in the above-described step S501, and is not limited to a particular acquisition method. In step S701, the acquisition unit 601 acquires a plurality of general-purpose teacher images (general-purpose teacher image group) by any acquisition methods.

In step S702, the extraction unit 602 extracts, as difficult teacher images, images for which it is difficult to infer demosaicking from the group of general-purpose teacher images acquired in step S701. Although the method of extracting difficult teacher images from the group of general-purpose teacher images is not limited to a particular method, the method described in Deep Joint Demosaicking and Denoising, Siggraph Asia 2016 is used here as an example. In this method, a mosaic image obtained by mosaicking a general-purpose teacher image is generated, a simple demosaicking method is applied to the mosaic image to generate a demosaicked image, and an error between the general-purpose teacher image and the demosaicked image is obtained. A difference image for the general-purpose teacher image and the demosaicked image is generated, and the error is, for example, the sum of the pixel values of the respective pixels in the difference image (the sum of the differences of between the pixel values of the corresponding pixel positions of the general-purpose teacher image and the demosaicked image). When the error between the general-purpose teacher image and the demosaicked image is equal to or greater than the threshold value θ, the general-purpose teacher image is extracted as a difficult teacher image. The simple demosaicking described above may use the result of bilinear interpolation and the training of Deep Joint Demosaicking and Denoising, Siggraph Asia 2016 which uses general-purpose teacher images and a small number of CNN epochs. The threshold value θ=−∞ may be set, and in this case, the general-purpose teacher image group and the difficult teacher image group coincide with each other.

Further, the extraction unit 602 generates a corresponding student image for each of the extracted difficult teacher images in the same manner as the generation unit 403. In this manner, the extraction unit 602 generates a plurality of image sets (difficult image sets) of a difficult teacher image and a student image generated based on the difficult teacher image.

In step S703, the learning unit 405 configures the CNN according to the network parameters acquired in step S504 (initializes the weights of the CNN). Then, the learning unit 405 uses the plural difficult image set generated in step S702 as learning data, and performs learning (preliminary learning) of demosaicking inferencing similarly to step S505 described above. Since an image for which demosaicking inferencing is difficult is an image with high learning efficiency, by learning of demosaicking inferencing using these difficult teacher images leads to improvement in performance in demosaicking inferencing by the CNN.

In step S704, the inspection unit 406 stores the latest network parameters (the network parameters of the CNN based on preliminary learning) updated by the learning unit 405 in the storage unit 407.

In step S502, according to the present embodiment, the statistical processing unit 402 performs statistical analysis on general-purpose teacher images instead of teacher images, and acquires statistics for each of the channels. Then, in step S503, according to the present embodiment, similarly to the first embodiment, the generation unit 403 generates a plurality of artificial teacher images based on statistics acquired for each of the channels in step S502, and generates a student image for each of the plurality of artificial teacher images. That is, in the present embodiment, in step S503, the generation unit 403 generates a plurality of image sets of an artificial teacher image and a corresponding student image.

In step S705, the acquisition unit 404 acquires "network parameters of the CNN obtained by preliminary learning" stored in the storage unit 407. In step S706, the learning unit 405 configures the CNN according to the network parameters acquired in step S705 (initializes the weights of the CNN). Then, the learning unit 405 uses the plurality of image sets generated in step S503 as learning data, and performs learning (main learning) of demosaicking inferring.

In the demosaicking inference learning according to the present embodiment, difficult teacher images are used as learning data for preliminary learning, and artificial teacher images are used as learning data for main learning. However, the present invention is not limited to this, and an artificial teacher image may be used as learning data for the preliminary learning, and a difficult teacher image may be used as learning data for the main learning. In addition, an image group obtained by mixing some of the difficult teacher images and some of the artificial teacher images in the preliminary learning may be used as learning data, and an image group obtained by mixing the rest of the difficult teacher image and the rest of the artificial teacher image in the main learning may be used as learning data. In addition, the ratio of the mixture of the difficult teacher images and the artificial teacher images may be controlled in each of the preliminary learning and the main learning. Further, the preliminary learning and the main learning may be alternately and repeatedly performed. Regardless of which learning method is adopted, both difficult teacher images and artificial teacher images are used to learn demosaicking inferencing.

In the present embodiment, a distribution function is calculated by actual measurement based on a group of general-purpose teacher images, and an artificial teacher images are generated in accordance therewith. This is because the statistical luminance distribution of the input images inputted into the CNN at the time of inferencing is thought to be equivalent to the luminance distribution of general-purpose teacher images. The population for measuring the distribution function need not be a general-purpose teacher image group, and measurement may be performed from another population such as a difficult teacher image group or an image database prepared in advance.

In this way, by virtue of the present embodiment, even in the case of demosaicking inference of input images having hues that are difficult to infer, robustness in relation to natural images is ensured, and it is possible to suppress the occurrence of artifacts in demosaicking inference results.

Third Embodiment

The configuration illustrated in FIGS. 4A to 4C and FIG. 6 can be appropriately modified/changed. For example, one functional unit may be divided into a plurality of functional units for each function, or two or more functional units may be integrated into one functional unit. Further, the configuration of FIGS. 4A to 4C or FIG. 6 may be configured by two or more apparatuses. In this case, the respective apparatuses are connected via a circuit or a wired or a wireless network, and perform data communication with each other to perform a cooperative operation, thereby realizing the processes described above as those performed by the image processing apparatus 100 or the image processing apparatus 600.

Further, in the above-described embodiments and modifications, although a CNN is used as an example of a learning model, other types of learning models may be used instead of a CNN. In this case, the parameters that define the learning model to be used will be used for the network parameters.

In addition, the numerical values, processing timing, processing order, processing subject, data (information) configuration, transmission destination, transmission source, storage location, and the like used in each of the above-described embodiments and modifications are given as an example in order to provide a specific explanation, and are not intended to limit the invention to such an example.

In addition, some or all of the above-described embodiments and modifications may be used in combination as appropriate. In addition, some or all of the above-described embodiments and modifications may be used selectively.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-032033, filed Mar. 1, 2021, which is hereby incorporated by reference herein in its entirety.

What is claimed is:

1. An image processing apparatus, comprising:
a processor; and
a memory, including instructions stored thereon, which, when executed by the processor cause the apparatus to:
acquire a probability distribution of a color in a teacher image group;
correct a variance in a probability distribution for hue in the teacher image group to a larger variance than for luminance;
generate, as an artificial teacher image, an image having a color sampled based on the corrected probability distribution;
perform learning of a learning model for performing a demosaicking inference, by using the artificial teacher image,
wherein the artificial teacher image has one or more connected regions having the same pixel value as a value sampled from the corrected probability distribution.

2. The image processing apparatus according to claim 1, wherein the instructions, when executed by the processor further cause the apparatus to generate a histogram of a color in a teacher image group, and acquire the probability distribution of the color from the histogram.

3. The image processing apparatus according to claim 1, wherein the instructions, when executed by the processor further cause the apparatus to obtain an average and a variance of a color in a teacher image group, and acquire the probability distribution based on the obtained average and variance.

4. The image processing apparatus according to claim 1, wherein the probability distribution is a probability distribution of each color in the teacher image group.

5. The image processing apparatus according to claim 1, wherein the probability distribution is a probability distribution in which probability distributions of colors in the teacher image group are integrated.

6. The image processing apparatus according to claim 1, wherein the instructions, when executed by the processor further cause the apparatus to generate, as an artificial teacher image, an image including a foreground having a color sampled based on the probability distribution and a background having a color sampled based on the probability distribution.

7. The image processing apparatus according to claim 1, wherein the instructions, when executed by the processor further cause the apparatus to the learning by using the artificial teacher image and a student image corresponding to the artificial teacher image.

8. The image processing apparatus according to claim 7, wherein the instructions, when executed by the processor further cause the apparatus to, in accordance with a color filter arrangement of an image capturing apparatus that captured an image of a generation source of the teacher image group, generate the student image by performing subsampling of color from the artificial teacher image.

9. The image processing apparatus according to claim 1, instructions, when executed by the processor further cause the apparatus to:

extract, from the teacher image group, as a difficult teacher image, a teacher image for which demosaicking inference is difficult, and perform the learning by using the difficult teacher image.

10. The image processing apparatus according to claim 9, wherein the instructions, when executed by the processor further cause the apparatus to make image groups by mixing difficult teacher images and artificial teacher images, perform preliminary learning, to the learning model, that uses a first image group of the made image groups, and then perform main learning to the learning model by using a second image group of the made image groups with a higher proportion of the artificial teacher image than the first image group.

11. The image processing apparatus according to claim 9, wherein the instructions, when executed by the processor further cause the apparatus to perform preliminary learning that uses the artificial teacher image, and then perform main learning by using the difficult teacher image.

12. The image processing apparatus according to claim 9, wherein the instructions, when executed by the processor further cause the apparatus to perform preliminary learning by using an image group obtained by mixing a portion of the difficult teacher image with a portion of the artificial teacher image, and then perform main learning by using an image group obtained by mixing a remaining portion of the difficult teacher image and a remaining portion of the artificial teacher image.

13. The image processing apparatus according to claim 12, wherein the instructions, when executed by the processor further cause the apparatus to a ratio at which to mix the artificial teacher image and the difficult teacher image in the preliminary learning and the main learning.

14. The image processing apparatus according to claim 10, wherein the instructions, when executed by the processor further cause the apparatus to alternately-repeat the preliminary learning and the main learning.

15. The image processing apparatus according to claim 1, wherein the instructions, when executed by the processor further cause the apparatus to acquire an inference result image which is a demosaicking inference result for an input image by using the learning model.

16. The image processing apparatus according to claim 1, wherein a size of each of the connected regions is larger than or equals to a filter size of the learning model.

17. An image processing apparatus, comprising:
a processor; and
a memory, including instructions stored thereon, which, when executed by the processor cause the apparatus to:
acquire a probability distribution of a color in a teacher image group;
generate, as an artificial teacher image, an image having a color sampled based on the probability distribution;
perform learning of a learning model for performing a demosaicking inference, by using the artificial teacher image; and
acquire a mosaic image chart including an object having a hue that is statistically infrequent, to generate a demosaicked image for which the mosaic image chart is demosaicked by using the learning model, to determine, in a case where an artifact occurrence degree in the demosaicked image is less than a threshold value, that an end condition of the learning has been satisfied and to determine, in a case where the artifact occurrence degree is equal to or greater than the threshold value, that the end condition of the learning has not been satisfied.

18. An image processing method, comprising:
acquiring a probability distribution of a color in a teacher image group;
correcting a variance in a probability distribution for hue in the teacher image group to a larger variance than for luminance;
generating, as an artificial teacher image, an image having a color sampled based on the corrected probability distribution;
performing learning of a learning model for performing a demosaicking inference, by using the artificial teacher image,
wherein the artificial teacher image has one or more connected regions having the same pixel value as a value sampled from the corrected probability distribution.

19. A non-transitory computer-readable storage medium storing a computer program for causing a computer to:
acquire a probability distribution of a color in a teacher image group;
correct a variance in a probability distribution for hue in the teacher image group to a larger variance than for luminance;
generate, as an artificial teacher image, an image having a color sampled based on the corrected probability distribution;
perform learning of a learning model for performing a demosaicking inference, by using the artificial teacher image,
wherein the artificial teacher image has one or more connected regions having the same pixel value as a value sampled from the corrected probability distribution.

* * * * *